United States Patent Office 3,767,664
Patented Oct. 23, 1973

3,767,664
BIS-BENZOXAZOLYL-NAPHTHALENES AS
OPTICAL BRIGHTENERS
Kurt Weber, Basel, Switzerland, assignor to Ciba-Geigy
AG, Basel, Switzerland
No Drawing. Original application Feb. 28, 1968, Ser. No. 708,798, now abandoned. Divided and this application Sept. 22, 1971, Ser. No. 182,869
Claims priority, application Switzerland, Mar. 7, 1967, 3,283/67
Int. Cl. C07d 85/48
U.S. Cl. 260—307 D                2 Claims

ABSTRACT OF THE DISCLOSURE

A process for optically brightening organic materials is provided which is characterized by the use of specific bis-benzoxazolyl-naphthalenes, which correspond to the formula

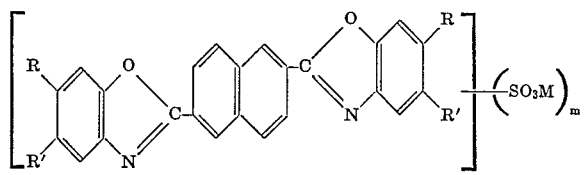

In this formula R represents a phenyl or methyl group, R' stands for hydrogen or the methyl group, or one of the residues R, R' for a carboxylic acid alkyl ester group or a methoxy group, M represents a hydrogen ion, alkali metal ion, ammonium or amine ion, and $m=0$, 1 or 2.

---

This is a division of application Ser. No. 708,798 filed Feb. 28, 1968, now abandoned.

The present invention provides a process for optically brightening organic materials with the aid of aryloxazole derivatives of naphthalene or a series of new aryloxazole derivatives of this kind. The process of this invention is characterized in that aryloxazole derivatives of the formula (1)

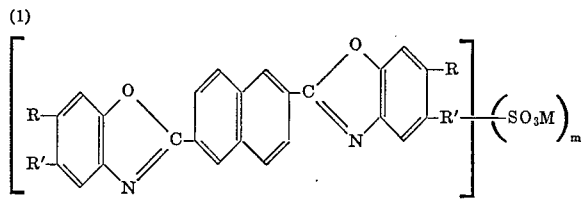

in which R represents a phenyl or methyl group, R' stands for hydrogen or the methyl group, or one of the residues R, R' for a carboxylic acid alkyl ester group or a methoxy group, M represents a hydrogen ion, alkali metal ion, ammonium or amine salt ion, and $m=0$, 1 or 2, are incorporated with or applied to the material to be optically brightened in an amount of 0.001 to 0.5% by weight, referred to the weight of the material to be optically brightened.

In this context carboxylic acid alkyl ester groups are above all those of a linear or branched nature whose alkyl group contains 1 to 18 carbon atoms.

The following two types of new aryloxazole derivatives are of special importance for use in the present process:
(a) The compound of the formula (2)

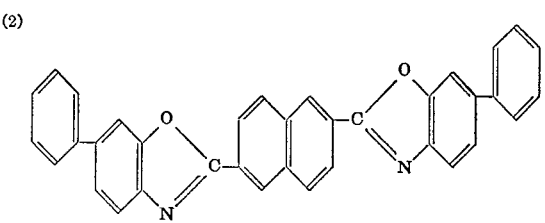

and (b) Compounds of the formula (3)

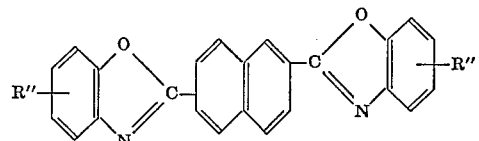

in which R" represents a carboxylic acid alkyl ester group in position 5 or 6 of the benzoxazolyl residue, preferably one whose alkyl group contains 1 to 4 carbon atoms.

The aryloxazole derivatives characterized above may be prepared by a variety of methods.

Very widely applicable is the process of the oxazole ring closure, starting from corresponding acylamides; for this purpose acyl compounds of the formula (4)

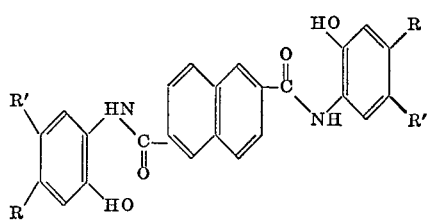

are cyclized by being heated to a temperature above 100° C., preferably in the presence of a dehydrating agent.

For the manufacture of the acyl compounds of the Formula 4 required for the process described above there may be used as one reactant naphthalene-2,6-dicarboxylic acid or a functional derivative thereof and as the other reactant an ortho-aminophenol of the formula (5)

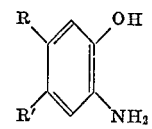

The reaction takes the following course (6)

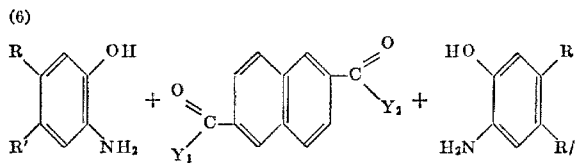

in which formulae $Y_1$ and $Y_2$ each is a hydroxyl group, a halogen atom (preferably chlorine) or an alkoxy group which preferably contains 1 to 8 carbon atoms.

The synthesis of compounds of the general Formula 1 and of compounds subordinated to this formula may principally also be carried out by a single-stage process starting from o-aminophenols of the Formula 5 and naphthalene-dicarboxylic acid derivatives of the Formula 6, these two components being heated together to an elevated temperature, advantageously from 120 to 350° C. in an inert gas, e.g. nitrogen. This reaction is preferably conducted in the presence of a dehydrating agent, the same as described for the final stage referred to above.

However, it is preferable to work in two stages, first condensing o-aminophenols of the Formula 5 with naphthalene-dicarboxylic acid derivatives of the Formula 6 to form acryl compounds of the Formula 4. This reaction is advantageously performed with the use of naphthalene-dicarboxylic acid chlorides which are condensed with the aminophenols in the presence of an organic solvent such as toluene, a xylene, chlorobenzene, dichlorobenzene, trichlorobenzene or nitrobenzene at a temperature from 100 to 220° C., whereupon the resulting acyl compound of the Formula 4 is converted into the azole derivative at a temperature from 120 to 350° C., if desired in the presence of a catalyst. When a carboxylic acid chloride is to be used as starting material, it may be prepared immediately before the condensation with the o-amino compound and without separation, from the free carboxylic acid and thionylchloride, if desired in the presence of a catalyst, such as pyridine, in the same solvent in which the subsequent condensation is to be performed.

Suitable dehydrating agents—including catalysts having a dehydrating effect—are for example boric acid, boric acid anhydride, zinc chloride, p-toluenesulphonic acid, also polyphosphoric acids including pyrophosphoric acid. When boric acid is used as catalyst, it is advantageously employed in an amount of 0.5 to 5%, referred to the weight of the reaction batch as a whole. It is also possible to use additionally high-boiling polar organic solvents e.g. dimethylformamide, dichlorobenzene, trichlorobenzene and aliphatic (possibly etherified) hydroxy compounds e.g. propyleneglycol, ethyleneglycol monoethyl ether or diethyleneglycol diethyl ether and high-boiling esters of phthalic acid e.g. phthalic acid dibutyl ester.

The just-described process is the most suitable process for preparing compounds according to Formula 1, where $m=0$. In preparing compounds where $m$ indicates 1 or 2 the most convenient method for introducing the sulphonic acid groups [provided sulphonic acid groups have not been introduced at the start by condensing o-aminophenols containing sulphonic acid groups] is the sequent sulphonation of the compounds with $m=0$ (as obtained in the above described manner) e.g. with sulphuric acid monohydrate, chlorosulphonic acid or with sulphuric acid containing sulphur trioxide, if required with heating. The sulphonic acid group is then converted into the corresponding salts with organic or preferably inorganic bases.

The optical brighteners of the composition defined above display in the dissolved or finely dispersed state a more or less pronounced fluorescence. According to this invention they are used for optically brightening a wide variety of organic materials of high or low molecular weight or of materials containing organic substances.

The following list contains a series of groups of organic materials, suitable for optical brightening, without any limitation to these examples.

(I) Synthetic organic materials of high molecular weight:

(a) Polymers based on organic compounds containing at least one polymerizable carbon-to-carbon double bond i.e. their homopolymers and copolymers and their after-treating products e.g. cross-linking, grafting or degradation products; polymer dilutions etc. Relevant examples are: Polymers based on $\alpha,\beta$-unsaturated carboxylic acids, especially of acrylic compounds (e.g. acrylic esters, acrylic acids, acrylonitrile, acrylamides and their derivatives and their methacrylic analogues), of olefinic hydrocarbons (e.g. ethylene, propylene, isobutylene, styrenes, dienes, especially butadiene, isoprene i.e. also rubbers and rubber-like polymers, also so-called ABS polymers), polymers based on vinyl or vinylidene compounds (e.g. vinyl esters, vinylchloride, vinylsulphonic acid, vinyl ethers, vinyl alcohol, vinylidenechloride, vinylcarbazole), of halogenated hydrocarbons (chloroprene, highly halogenated ethylenes), of unsaturated aldehydes and ketones (e.g. acrolein etc.), of allyl compounds etc., graft polymers (e.g. obtained by grafting vinyl monomers), cross-linking products (e.g. accessible by means of bifunctional crosslinking agents such as divinylbenzene, polyfunctional allyl compounds or bis-acrylic compounds) or those accessible by partial decomposition (hydrolysis, depolymerization) or modification of reactive groupings (e.g. esterification, etherification, halogenation, auto-crosslinking).

(b) Other polymers e.g. those accessible by ring opening, e.g. polyamides of the polycaprolactam type; also formaldehyde polymers, or polymers accessible either by polyaddition or by polycondensation, such as polyethers, polythioethers, polyacetals, thioplasts.

(c) Polycondensates or precondensates based on bifunctional or polyfunctional compounds containing condensible groups, their homo- and co-condensates and after-treating products, for example: Polyesters, saturated polycondensates (e.g. polyethylene terephthalate) or unsaturated (e.g. maleic acid+dialcohol polycondensates and their crosslinking products with copolymerizable vinyl monomers); linear and branched polycondensates (also those based on polyhydric alcohols e.g. alkyd resins), polyamide (e.g. hexamethylenediamine adipate), maleinate resins, melamine resins, phenolic resins (novolaks) aniline resins, furan resins, carbamide resins and also their precondensates and similarly constituted products, polycarbonates, silicone resins, and others.

(d) Polyadducts such as pollurethanes (crosslinked or not), epoxy resins.

(II) Semisynthetic organic materials e.g. cellulose esters or mixed esters (acetate, propionate), nitrocellulose, cellulose ethers, regenerated cellulose (viscose rayon, cuprammonium cellulose) or their after-treated products, casein synthetics.

(III) Natural organic materials of animal or vegetable origin, for example those based on cellulose or proteins such as wool, cotton, silk, bast, jute, hemp, furs and hairs, leathers, finely dispersed wood pulp, natural resins (such as colophony, especially lacquer resins), furthermore rubber, gutta percha, balata, and their after-treated and modified products (e.g. those obtained by hardening or crosslinking or grafting), degradation products (e.g. by hydrolysis, depolymerization), products accessible by modification of reactive groups (e.g. by acylation, halogenation, crosslinking or the like).

The organic materials concerned may be at widely differing stages of their processing (raw materials, semi-finished products or finished products) and physical states. They may be in the form of products shaped in a wide variety of ways, that is to say, for example, as predominantly three-dimensional objects such as blocks, panels, sections, tubes, injection mouldings or components of a great variety, chips or granules, foamed products; predominantly two-dimensional structures such as films, foils, lacquers, tapes, impregnations or coatings, or predominantly unidimensional materials such as filaments, fibres, flocks, bristles or wires. The said materials may also be in unshaped states in a wide variety of homogeneous or inhomogeneous forms of distribution and physical states, for example in the form of powders, solutions, emulsions, dispersions, latices (examples: lacquer solutions, polymer dispersions), sols, gels, putties, pastes, waxes, adhesives or grouting and sealing compositions and the like.

Fibrous materials may be, for example, monofils, staple fibres, flocks, hanks, textile threads, yarns, doubled yarns, fibre fleeces, felts, padding, flocculated materials or as textile fabrics or textile laminates, knitwear, papers, cardboards, paper pulps and the like.

The compounds to be used according to this invention are of special value for the treatment of textile organic materials, especially woven textile fabrics; when fibres—which may be in the form of staple fibres, monofils, hanks, fabrics, tricots, fleeces, napped substrates or textile laminates—are to be optically brightened by the present process this is advantageously done in an aqueous medium in which the chosen compound is finely dispersed (suspended or, if desired, dissolved. If desired, there may be added to the treatment liquor a usual dispersant, e.g. soaps, polyglycol ethers of aliphatic alcohols, fat amines or alkylphenols, cellulose sulphite waste liquor or condensates of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may also be added to, or incorporated with, the materials before or during their shaping. Thus, for example, in the manufacture of films, foils, tapes or mouldings they may be added to the moulding or injection moulding composition or they may be dissolved, dispersed or in any other way finely distributed in the spinning solution before spinning. The optical brighteners may also be added to the starting materials, reaction mixtures or intermediate products used to produce fully synthetic or semi-synthetic organic materials, that is to say also before or during the chemical reaction, e.g. a polycondensation (including the precondensates), a polymerization (including the prepolymers) or a polyaddition.

The new optical brighteners can, of course, also be used wherever organic materials of the kind indicated above are combined with inorganic materials in any form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with other optical brighteners, with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may also be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher aliphatic alcohols, also salts of aliphatic alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher aliphatic alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coatings, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

The treatment of polyester fibres with the brighteners of this invention is advantageously performed by impregnating these fibres with an aqueous dispersion of the brightener at a temperature below 75° C., e.g. at room temperature, and then subjecting them to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

Unless otherwise indicated, parts and percentages in the following manufacturing instructions and examples are by weight.

MANUFACTURING INSTRUCTIONS (A) A mixture of 7.6 g. of naphthalene-2,6-dicarboxylic acid dichloride and 7.4 g. of 4-hydroxy-3-amino-1-methylbenzene in 100 ml. of anhydrous trichlorobenzene is stirred, heated to 150° C. and the batch is heated for 4 hours at 145 to 150° C., during which hydrochloric acid gas escapes and a bright suspension forms. Then 0.5 g. of boric acid anhydride is added and the temperature of the batch is raised to 210 to 215° C., and the solvent is distilled off. Then 200 ml. of dibutyl phthalate are added and the temperature of the reaction mixture is raised under nitrogen at 320° C., whereupon a brown, clear solution forms, which is heated for 10 minutes at 320° C., then cooled to 80° C., mixed with 150 ml. of methanol and cooled to 10° C. The crystalline product is suctioned off, washed with methanol and recrystallized from o-dichlorobenzene with the aid of bleaching earth.

Pale yellow needles melting at 185–185.5° C.

The compounds listed in the following table are accessible in a similar manner; in this table column I=formula No.
column II=structural formula
column III=pure yield in percent of theory
column IV=melting point (uncorrected)
column V=empirical formula and analytical data (upper line: calculated); (lower line: found).

| I | II | III | IV | V | | |
|---|---|---|---|---|---|---|
| 8 | H₃COOC-[structure] | 55.6 | >300 | $C_{28}H_{18}N_2O_6$ C 70.29 H 3.79 N 5.86 C 70.53 H 4.01 N 5.83 | | |
| 2 | [structure] | 58.9 | >300 | $C_{36}H_{22}N_2O_2$ C 84.03 H 4.31 N 5.44 C 83.85 H 4.54 N 5.48 | | |
| 9 | H₃C-[structure]-CH₃ | 53.0 | >300 | $C_{26}H_{18}N_2O_2$ C 79.98 H 4.65 N 7.17 C 79.86 H 4.65 N 7.11 | | |
| 10 | H₃CO-[structure]-COH₃ | 26.4 | 293–293.5 | $C_{28}H_{18}N_2O_4$ C 73.92 H 4.30 N 6.63 C 73.89 H 4.32 N 6.51 | | |
| 11 | H₃C-, H₃C-[structure]-CH₃, CH₃ | 33.5 | >300 | $C_{28}H_{22}N_2O_2$ C 80.36 H 5.30 N 6.69 C 80.42 H 5.41 N 6.76 | | |

Yield: 6.9 g. (=59.0% of theory) of the compound of the formula (7)

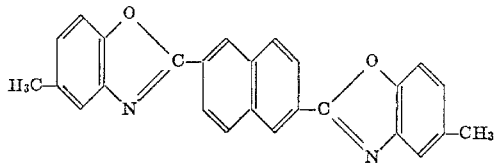

in small, pale yellow needles melting above 300° C.

Analysis (after high-vacuum sublimation). — Calculated for $C_{26}H_{18}N_2O_2$ (percent): C, 79.98; H, 4.65; N, 7.17. Found (percent): C, 79.79; H, 4.74; N, 7.16.

Naphthalene-2,6-dicarboxylic acid dichloride may be prepared in the following manner:

A suspension of 205 g. of naphthalene-2,6-dicarboxylic acid in 500 ml. of anhydrous chlorobenzene is mixed with 2 ml. of anhydrous pyridine and 400 ml. of thionylchloride, and while stirring the batch it is slowly heated to 80° C. and stirred on for 1 hour at 80 to 85° C. The reaction mixture is raised within 3 hours to 100° C., then cooled to 10° C. and the reaction product is recrystallized from tetrachloroethylene.

Yield: 106 g. (=81.4% of theory).

(B) 10 grams of the compound of the Formula 9 are dissolved with stirring at 20 to 25° C. in 150 ml. of oleum containing 15% of sulphur trioxide. The whole is stirred for 6 hours at 20 to 25° C. and then stirred into about 1000 parts of an ice-water mixture. The precipitate formed is suctioned off, dissolved in 1000 parts of hot water, filtered and adjusted with sodium hydroxide solution to a pH value of 4. On addition of 100 parts of crystalline sodium acetate the product precipitates (pH value: 7.5), the precipitate is then suctioned off, washed with saturated sodium acetate solution and dried under vacuum at 80 to 85° C. The product is boiled with absolute ethanol, suctioned off, washed with absolute alcohol and dried under vacuum, to yield the compound of the Formula 12.

In the following table column I=formula No.
column II=structural formula
column III=aspect
column IV=empirical formula and analytical data (upper line: calculated) (lower line: found).

| I | II | III | IV | | |
|---|---|---|---|---|---|
| 12 | 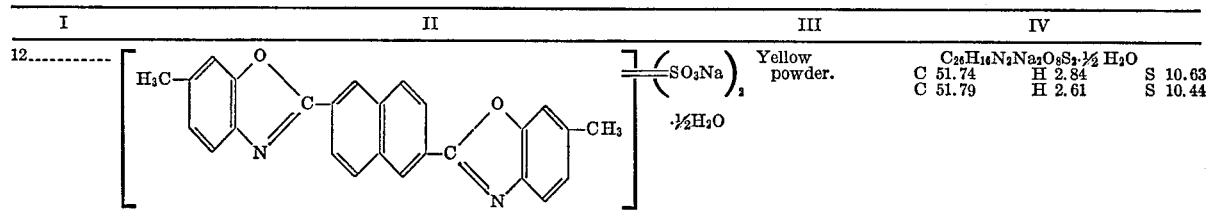 | $\left(SO_3Na\right)_2$ ·½H₂O | Yellow powder. | $C_{26}H_{16}N_2Na_2O_8S_2$·½ H₂O<br>C 51.74  H 2.84  S 10.63<br>C 51.79  H 2.61  S 10.44 | |

In an analogous manner the compound of the formula (7) furnishes the sulphonic acid derivative of the formula

| 13 | 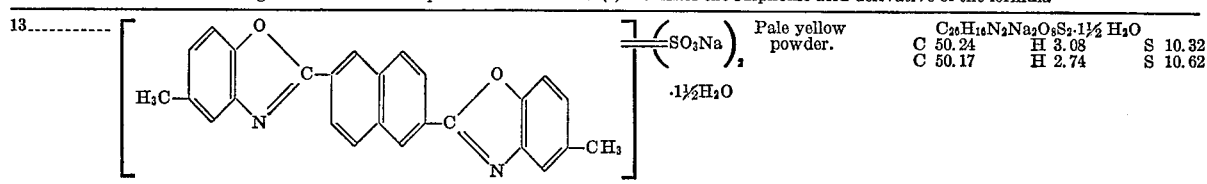 | $\left(SO_3Na\right)_2$ ·1½H₂O | Pale yellow powder. | $C_{26}H_{16}N_2Na_2O_8S_2$·1½ H₂O<br>C 50.24  H 3.08  S 10.32<br>C 50.17  H 2.74  S 10.62 | |

(C) 6.0 grams of the compound of the Formula 2 are dissolved with stirring at 20 to 25° C. in 100 ml. of 100% sulphuric acid, then stirred for 5 hours at 20 to 25° C. and then stirred into about 1000 parts of ice-water. The precipitate formed is suctioned off, suspended in ½ litre of water and the pH value is adjusted to 7 by adding sodium hydroxide solution. The product is suctioned off, dried, twice pasted with 100 ml. of water on each occasion, suctioned off and dried under vacuum, to yield about 5.7 g. (=67.9% of theory) of the compound of the formula (14)

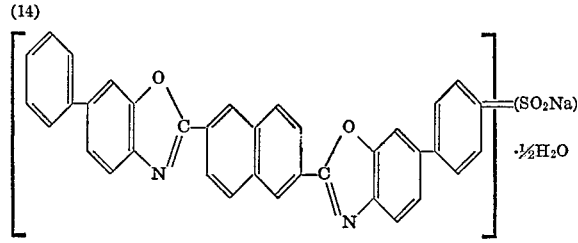

in the form of a pale yellow powder.

*Analysis.*—Calculated for $C_{36}H_{20}N_2Na_2O_8S_2$·½H₂O (percent): C, 59.42; H, 2.91; S, 8.81. Found (percent): C, 59.38; H, 2.75; S, 8.67.

(D) 17.7 g. of naphthalene-2,6-dicarboxylic acid dichloride and 27.3 g. of 4-hydroxy-3-amino-benzoic acid isopropyl ester are heated in 300 ml. of anhydrous trichlorobenzene with the addition of 50 ml. of anhydrous pyridine at 155° C. with stirring; the reaction mixture is maintained at a temperature of 155–160° C. for 4 hours. By passing a current of nitrogen over the surface the air is expelled out of the reaction vessel during the entire reaction. After the addition of 1 g. of boric acid the temperature of the reaction mixture is increased to 210–215° C., and about 200 ml. of the solvent are distilled off. The batch is allowed to cool to 80° C., 300 ml. of methanol are added and the batch is cooled to 10° C. The product which crystallizes out is filtered with suction, washed with methanol and dried in vacuo at 90–100° C. The product is recrystallized three times from tetrachlorethylene with the addition of bleaching earth to yield about 5.3 g. (14.2% of the theory) of the compound of the formula (15)

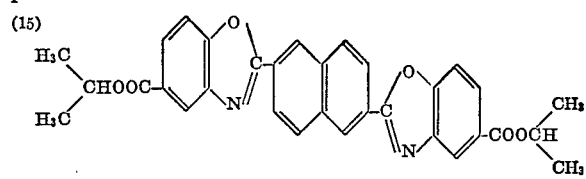

in the form of white needles melting at 267–267.5° C.

*Analysis.*—Calculated for $C_{32}H_{26}N_2O_6$ (percent): C, 71.90; H, 4.90; N, 5.24. Found (percent): C, 71.80; H, 4.99; N, 5.29.

EXAMPLE 1

100 parts of polyester granulate of polyethyleneglycol terephthalate are intimately mixed with 0.05 part of one of the azole derivatives of the Formulae 2 or 7 to 11, and the whole is melted at 285° C. with stirring. When this spinning mass is spun through conventional spinnerets, strongly brightened polyesters fibres are obtained.

Alternatively, the afore-mentioned azoles may be added to the starting materials before or during the polycondensation leading to the polyester.

EXAMPLE 2

Cotton is washed at a goods-to-liquor ratio of 1:40 in a bath heated at 60 to 65° C. which contains 10 g. of a detergent of the following composition:

33.3% of soap
11.0% of anhydrous sodium carbonate
14.0% of sodium pyrophosphate
7.0% of sodium perborate
3.0% of magnesium silicate
0.04% of the compound of the Formula 12, 13 or 14
31.66% of water.

The cotton is then rinsed and dried. Cotton treated in this manner displays a white effect of good fastness to light, acids and chlorine.

When washing is performed in the additional presence of an agent that gives off chlorine, the optical brightening effect is in no way impaired.

When, instead of the detergent used above, a detergent is used that consists of anionic, nonionic or cationic, liquid or solid synthetic wash-active compounds, similar white effects are obtained.

If desired, the washing operation described above may be performed at the boil.

EXAMPLE 3

A bleached fabric of polyamide stable fibre (nylon spun) is treated for 30 minutes at a goods-to-liquor ratio of 1:30 in a bath heated at 90 to 95° C. which contains, referred to the fibrous material, 0.1% of the compound of the Formula 12 or 13 and 1% of 40% acetic acid. After having been rinsed and dried, the fabric treated in this manner has a good bright appearance.

When a polyamide filament fabric is used instead of the polyamide staple fibre fabric, similar, good brightening effects are achieved.

EXAMPLE 4

Bleached cotton fabric is washed for 30 minutes at a goods-to-liquor ratio of 1:30 at 60° C. in a liquor containing per litre the following ingredients:

0.012 g. of the brightener of the Formula 12, 13 or 14
1 g. of active chlorine (Javelle water)

4 g. of a washing powder of the following composition:
  15.00% of dodecylbenzenesulphonate
  10.00% of sodium laurylsulphonate
  40.00% of sodium tripolyphosphate
  25.75% of anhydrous sodium sulphate
  7.00% of sodium metasilicate
  2.00% of carboxymethylcellulose and
  0.25% of ethylenediamine-tetraacetic acid.

After having been rinsed and dried, the fabric displays a strong brightening effect which has good fastness to acids and chlorine.

If desired, the washing powder of the above composition may be incorporated directly with the brighteners of the above formulae.

EXAMPLE 5

A polyamide fibre fabric (Perlon) is introduced at a goods-to-liquor ratio of 1:40 into a bath heated at 60° C. which contains (referred to the weight of the fabric) 0.3% of a brightener of the Formula 12 or 13 and, per litre, 1 g. of 80% acetic acid and 0.25 g. of an adduct of 30 to 35 mols of ethylene oxide with 1 mol of commercial stearyl alcohol. The whole is heated within 30 minutes to the boil and maintained at the boil for 30 minutes longer. After having been rinsed and dried the fabric displays a strong brightening effect.

EXAMPLE 6

10,000 parts of a polyamide in chip form, prepared in known manner from hexamethylenediamine adipate, are mixed for 12 hours in a tumbler with 30 parts of titanium dioxide (rutile modification) and 5 parts of the compound of the Formulae 2, 7 to 11 or 13. The chips thus obtained are melted in a boiler heated at 300 to 310° C. by means of oil or diphenyl vapour, after having displaced the atmospheric oxygen from it by means of superheated steam, and the melt is stirred for half an hour and then expressed under a nitrogen pressure of 5 atmospheres (gauge) through a spinneret. The resulting filament is cooled and wound on a spinning bobbin. The filaments thus obtained are optically brightened.

What is claimed is:

1. The compound of the formula

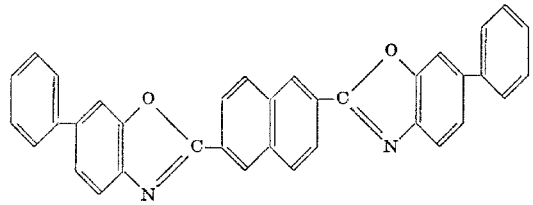

2. The compound of the formula

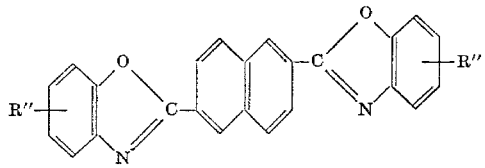

in which R" represents a carboxylic acid alkyl ester group in position 5 or 6 of the benzoxazolyl residue, whose alkyl group contains 1 to 4 carbon atoms.

References Cited
UNITED STATES PATENTS 3,336,330   7/1967   Schinzel et al. _____ 260—307
3,709,896   1/1973   Frischkorn et al. __ 260—307 D ALEX MAZEL, Primary Examiner R. V. RUSH, Assistant Examiner U.S. Cl. X.R.

252—301.2 W; 260—559 S